Oct. 31, 1933.            H. B. ACKERMAN            1,933,083
THERMOSTAT
Filed April 23, 1932
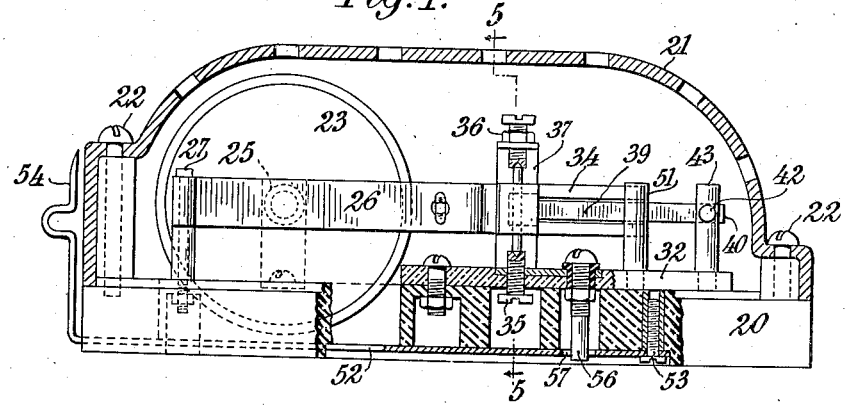
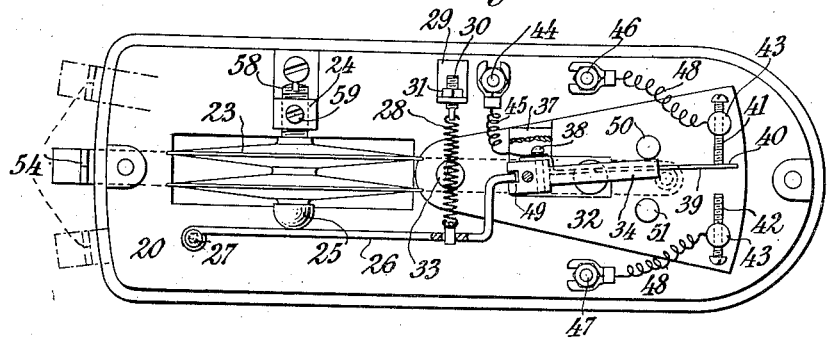
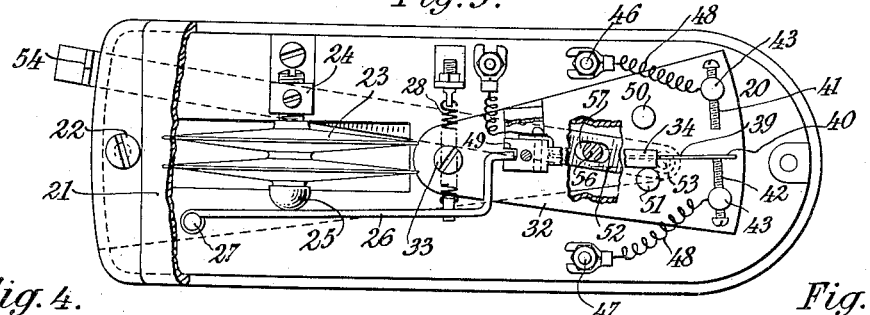
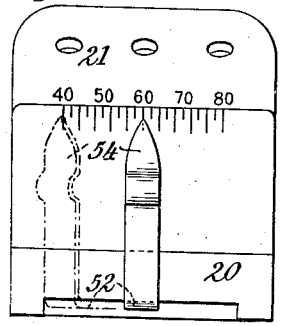
INVENTOR
Howard B. Ackerman,
BY
Fraser, Myers & Manley.
ATTORNEYS.

Patented Oct. 31, 1933

1,933,083

UNITED STATES PATENT OFFICE 1,933,083

THERMOSTAT

Howard B. Ackerman, Brooklyn, N. Y., assignor to Gold Car Heating & Lighting Company, Brooklyn, N. Y., a corporation of New York Application April 23, 1932. Serial No. 607,036

7 Claims. (Cl. 200—140)

This invention relates to an improved electric thermostat of general application although of a type especially adapted for use in regulating the admission of energy to heating apparatus in accordance with variations of temperature.

One object of the invention is to provide an adjustable thermostat of the above-described character having improved means whereby the opening of the electric terminals may be postponed until the thermomotive element of the thermostat has built up energy sufficient to cause them to be snapped apart with a "quick break" action. This tends to reduce the damaging effect of the spark when the electric circuit is broken and thereby lengthens the life of the instrument as a result of a refinement which also causes its operation to be more reliable.

Another object of the invention is to provide a thermostat which may be readily adjusted to be effective at different temperatures without materially affecting the relations between its thermomotive element and its circuit-controlling elements.

In the accompanying drawing illustrating a preferred form of the invention:—

Figure 1 is a view partly in side elevation and partly in longitudinal section illustrating an assembled thermostat embodying the invention.

Fig. 2 is a face view of the thermostat with the cover removed, the parts being represented as having been adjusted to effect changes in an electric circuit at an intermediate temperature.

Fig. 3 is a face view of the same thermostat with a portion of the cover broken away, the parts being represented as having been adjusted to effect changes of circuit conditions at a relatively low temperature.

Fig. 4 is an end view of the assembled thermostat.

Fig. 5 is a transverse sectional view of the thermostat, the section being taken along the line 5—5 of Fig. 1.

Fig. 6 is a detail view of one form of magnetic device which may be used in the construction of the thermostat.

The various parts of the thermostat may be mounted upon a support which should preferably comprise a base block 20 of suitable insulating material, and the parts may be covered and protected by means of a cover 21 secured to the support by means of fastening devices 22.

The thermomotive element of the thermostat may comprise a heat sensitive unit 23 which should be of such form and construction as to be caused to change its dimensions in response to variations of temperature in such manner as to be capable of being used as a means of operating other parts of the mechanism. In the form of device herein disclosed for purposes of illustration the thermomotive device 23 comprises a hollow expansible metal structure filled with any appropriate volatile fluid. It may be firmly secured at one end to a pedestal 24 mounted on the base block 20 and have at its opposite end a rounded protuberance 25 adapted to bear against a lever 26 pivotally connected at one end to a spindle 27 mounted on the base block and yieldingly held against the thermomotive element by means of a spring 28 having one of its ends secured to the lever near the end opposite its connection with the spindle and its other end adjustably connected with a spring-retaining device 29 mounted on the base block.. The connection between the spring and its retaining device may comprise a threaded draw bar 30 passed through an opening in the retaining element 29 and held in place by a nut 31, the tension of the spring being dependent upon the position of the draw bar as determined by the rotation of the nut.

The electric circuit-controlling elements of the thermostat may preferably be mounted upon a carrier 32 of insulating material, pivotally connected with the base block as at 33. In the form shown the circuit-controlling element comprises a lever 34 pivotally mounted between a bearing 35 in the carrier and a bearing 36 mounted in a bracket 37 extended upwardly from the carrier. Secured to the lever 34 in any appropriate manner, as by means of a fastening device 38, is an electric conductor 39 having a terminal 40 adapted to be moved by the lever in opposite directions into and out of contact with a pair of electric terminals 41, 42, supported in any suitable manner by pedestals 43 extending upwardly from the carrier 32. The conductor 39 may be yieldingly connected with a binding post 44 by means of a resilient electric connector 45 of physical characteristics such as to afford no material resistance to the movements of the lever in the carrier or to the movements of the carrier with respect to the base block. Likewise the terminals 41, 42 may be connected with binding posts 46, 47, by means of flexible electric connectors 48, which will afford no appreciable resistance to movements of the carrier with respect to the base block.

The movements of the thermomotive device 23 may be communicated to the circuit-controlling lever 34 by means of the lever 26, the free end of which may for such purpose have movement-transmitting engagement with a notch 49 in the end of the lever opposite the electric terminal 40.

The means whereby the separation of the electric terminal 40 from either of the electric terminals 41, 42 may be postponed until the thermomotive device has stored sufficient energy to cause them to be snapped apart with a "quick break" action, which constitutes an important element of the invention, comprises magnetic means whereby a magnetic circuit may be closed whenever the electric terminals are brought into contact. In the preferred form of the invention herein disclosed the lever 34 is in the form of a permanent magnet of the horseshoe type and constitutes the main element of the magnetic means for postponing the separation of the electric terminals. To cooperate with the magnet 34 a pair of spaced armatures 50, 51, are mounted on the carrier in positions such as to be engaged by and close the air-gap of the magnet whenever the lever is moved to a position such as to cause the electric terminal 40 to make contact with either of the contacts 41, 42.

It will be observed that the construction of the mechanism is such that the air-gap of the magnet 34 is always closed by one or the other of the two armatures except during the brief interval of time within which the lever is moved from one of its extreme positions to the other as the temperature passes through the predetermined standard at which the thermostat is intended to change the circuits. This means that the magnetic circuit of the magnet will be almost constantly closed and the magnet will therefore maintain a substantially uniform strength of magnetization for an indefinite period.

The temperature at which the circuits will be changed by the movement of the lever 34 due to the expansion and contraction of the thermomotive device 23 may be varied by shifting the carrier 32 about its pivotal connection 33. If, for example, the parts of the mechanism are so adjusted as to shift the circuit connections at a temperature of 60 degrees when the carrier is in its intermediate position as indicated in Fig. 2, the circuits may be caused to be shifted at a lower temperature, as, for example, 40 degrees, if the carrier is shifted to the position indicated in Fig. 3. Likewise, the instrument may be adjusted to cause the circuits to be changed at a higher temperature, as, for example, 80 degrees, by shifting the carrier in the opposite direction to that to which it is indicated as having been shifted in Fig. 3.

The sensitiveness of the adjustment or degree of variation of temperature which will result from a given angular rotation of the carrier with respect to the base block 20 will be dependent upon the distance between the axes of the pivotal connection between the lever 34 and the carrier and the pivotal connection between the carrier and the base block. If this distance is relatively large a slight angular movement of the carrier will result in a relatively large variation of temperature, whereas if this distance is small a relatively large angular adjustment of the carrier will result in a relatively small change of temperature.

As a convenient means of effecting and indexing the adjustment of the carrier 32, the device may be provided with an appropriate operating element herein disclosed as a lever 52, which may be pivotally connected to the under side of the base block 20 as at 53. The lever 52 may be turned upwardly and terminate with an index finger 54 adapted to move over a graduated temperature scale 55 on any convenient portion of the supporting structure, over which the indexing element moves. As herein shown, the temperature scale is applied to one end of the cover 21.

Movements of the lever 52 may be communicated to the carrier 32 by means of a pin 56 secured to the carrier and having an end in driving engagement with a slotted portion 57 of the lever.

The mechanical advantage of the lever 52 with respect to the carrier 32 and the sensitiveness of the adjustment of the carrier by movements of the lever will be dependent upon the relative position of the pin 56 with respect to the pivotal connection 53 between the lever and the base block and the pivotal connection 33 between the carrier and the base block.

If desired, the thermomotive element 23 may be adjustably mounted in the pedestal 24 in any appropriate manner, as, for example, by means of a headed, threaded, attaching stud 58 and set-screw 59.

The thermostat may be electrically connected with the apparatus which it is intended to control by attaching the terminals of the parts of the circuit to be opened and closed by the thermostat to the binding posts 44, 46 and 47.

It will be apparent that the invention is not necessarily limited to a thermostat having circuits to be opened and closed on both increase and decrease in temperature, but would apply equally well were either of the terminals 41, 42 omitted.

It will also be apparent that the magnetic device need not include a part actually carried by the circuit-controlling lever of which the electric terminal 40 is a part. All that is important is that the magnetic device shall be so associated with the electric terminals that the magnetic circuit may be closed when the gap between the electric terminals is closed and that the magnetic circuit must be opened before the electric terminals can be separated.

It is an important feature of the invention that the adjustment of the carrier to vary the temperature at which the electric circuits will be opened and closed by the thermostat results in but a relatively small change of position of the connection through which movement is transmitted from the end of the lever 26 to the adjacent end of the lever 34, wherefore the variation in the tension of the spring 28 resulting from the adjustment is negligible and will have no material effect upon the control of the mechanism by the thermomotive element 23.

The invention is not intended to be limited to the specific form selected for purposes of illustration but should be regarded as covering modifications and variations thereof within the scope of the appended claims.

What is claimed is:—

1. An electric thermostat comprising a support, a carrier pivotally connected with the support, an electric terminal mounted on the carrier at a material distance from its pivotal connection with the support, a circuit-controlling lever pivotally connected with the carrier, the axis of the pivotal connection between the lever and the carrier, and the axis of the pivotal connection between the carrier and the support, being disposed in the same direction and not materially distant from each other, an electric terminal carried by an arm of the lever, a thermomotive device mounted in the support, and a driving connection between the thermomotive device and an arm of the lever whereby the lever may cause the electric terminals to be moved into and out of contact in accordance with variations of temperature, the effective movement-transmitting connection between the thermomotive device and the lever being slightly out of alignment with the axis of the pivotal connection between the carrier and the support whereby the temperatures at which the electric terminals will be moved into and out of contact may be varied by adjusting the angular position of the carrier with respect to the support.

2. A thermostat, substantially as defined by claim 1, having a carrier-adjusting element movably mounted on the support, said adjusting element having a portion adapted to serve as an indexing element, a driving connection of relatively large mechanical advantage between said adjusting element and the carrier whereby relatively small movements of adjustment of the carrier may be effected as a result of relatively large movements of the adjusting element, and a graded temperature scale on a part of the support along which the indexing element may be moved during the movements of the adjusting element to adjust the carrier.

3. A thermostat, substantially as defined by claim 1, having a magnetic device comprising two parts, one mounted on the lever and one on the carrier, so located and related as to be caused to make contact and close a magnetic circuit when the gap between the electric terminals is closed, the magnetic device comprising means whereby the separation of the electric terminals may be postponed until the thermomotive device has stored energy sufficient to snap them apart with a "quick break" movement.

4. An electric thermostat comprising a support, a carrier pivotally connected with the support, a pair of spaced electric terminals mounted on the carrier at substantial distances from its pivotal connection with the support, a circuit-controlling lever pivotally connected with the carrier, the axis of the pivotal connection between the lever and the carrier, and the axis of the pivotal connection between the carrier and the support, being disposed in the same direction and not materially distant from each other, an electric terminal carried by an arm of the lever, a thermomotive device mounted in the support, and a driving connection between the thermomotive device and an arm of the lever whereby the lever may cause its electric terminal to be selectively moved into contact with the respective terminals of the spaced pair in accordance with variations of temperature, the effective movement-transmitting connection between the thermomotive device and the lever being slightly out of alignment with the axis of the pivotal connection between the carrier and the support whereby the temperatures at which the terminal on the lever will be separated from one of the terminals of the spaced pair and moved into contact with the other may be varied by adjusting the angular position of the carrier with respect to the support.

5. A thermostat, substantially as defined by claim 4, having a magnetic device comprising a magnet of the horseshoe type mounted on the circuit-controlling lever and a pair of spaced armatures mounted on the carrier in positions such that the magnet will be caused to make contact with one or the other of them and have its air-gap closed whenever the gap is closed between the electric terminal on the lever and either of the electric terminals of the spaced pair, said magnet serving as means whereby the separation of the electric terminal on the lever from either of the terminals of the spaced pair may be postponed until the thermomotive device has stored energy sufficient to cause them to be snapped apart with a "quick break" action.

6. A thermostat, substantially as defined by claim 1, having a magnetic device comprising two parts, one mounted on the lever and one on the carrier, so located and related as to be caused to decrease the reluctance of the magnetic circuit when the gap between the electric terminals is closed, the magnetic device comprising means whereby the separation of the electric terminals may be postponed until the thermomotive device has stored energy sufficient to snap them apart with a "quick break" movement.

7. A thermostat, substantially as defined by claim 4, having a magnetic device comprising a magnet of the horseshoe type mounted on the circuit-controlling lever and a pair of spaced armatures mounted on the carrier in positions such that the reluctance of the magnetic circuit will be materially decreased by the approach of the poles of the magnet towards one or the other of the two armatures whenever the gap is closed between the electric terminal on the lever and either of the electric terminals of the spaced pair, said magnet serving as means whereby the separation of the electric terminal on the lever from either of the terminals of the spaced pair may be postponed until the thermomotive device has stored energy sufficient to cause them to be snapped apart with a "quick break" action.

HOWARD B. ACKERMAN.